(No Model.)
M. WOLF.
FLUID MEASURE.
No. 276,652. Patented May 1, 1883.
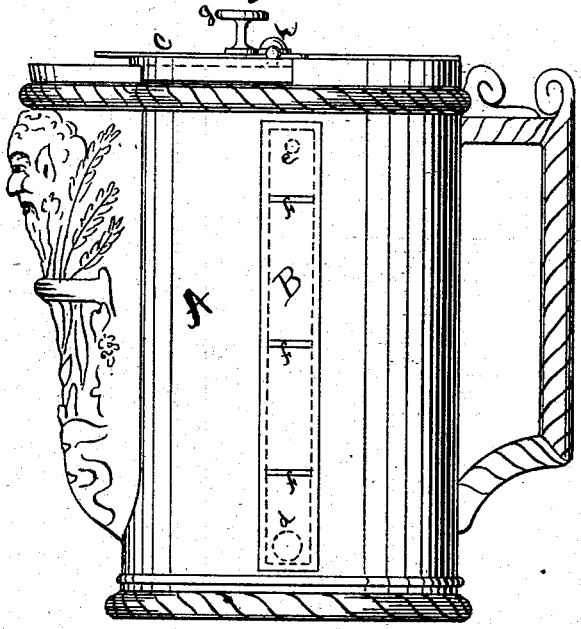
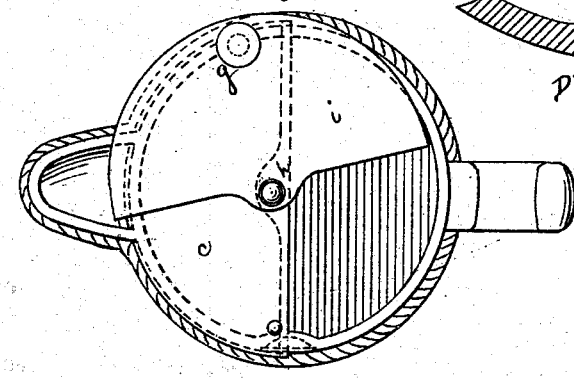
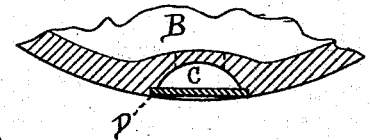
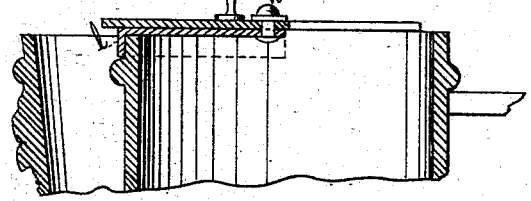
Witnesses. Inventor.

UNITED STATES PATENT OFFICE.

MAX WOLF, OF BROOKLYN, NEW YORK.

FLUID-MEASURE.

SPECIFICATION forming part of Letters Patent No. 276,652, dated May 1, 1883.

Application filed August 23, 1882. (No model.)

*To all whom it may concern:*

Be it known that I, MAX WOLF, of the city of Brooklyn, in the county of Kings and State of New York, have invented certain new and useful Improvements in Fluid-Measures, of which the following is a specification, reference being had to the accompanying drawings, wherein—

Figure 1 is a side elevation of the measure, showing the channel and apertures therein under the scale in dotted lines. Fig. 2 is a top view thereof, showing the cover partly open; Fig. 3, a vertical section of the upper part of the measure, and Fig. 4 a cross-section of the scale and channel behind it.

My invention relates more particularly to liquid-measures made of pottery or glass ware, and its main use is in the measurement of such fluids as ale, porter, beer, &c., in small quantities, from the smallest to the capacity of the vessel.

The object of my invention is to apply a scale to a measuring pitcher or mug, so as to correctly measure quantities less than its capacity.

The nature of my invention consists in such a construction of the vessel as will provide a recess or slot in the side thereof, extending from top to bottom, or sufficiently near each, with suitable apertures at each end to permit the ingress and egress of the fluid and air, over which recess or slot is securely cemented or otherwise secured a glass or other transparent plate, upon which are pressed or otherwise placed the marks of a scale at proper intervals; and, also, in the application to such a measuring-vessel of a top, of flat metal, in segments of a circle, so arranged as to swing the one upon the other and produce a tight cover.

In the drawings, A represents the measure, which in this instance is composed of terra-cotta. B is the measuring device, composed of $c$, a recess in the side of the vessel, extending from its top, or nearly so, to near the bottom, with apertures $d$ and $e$, respectively, at bottom and top, extending into the interior of the measure, and D, a glass plate, on which is a series of marks, $fff$, constituting a scale intended to indicate the points at which the vessel would contain certain defined amounts of liquid. The recess $c$ is obtained in the manufacture of the vessel by sinking the groove in the material when soft, at which time the apertures are also made. The recess C terminates at its sides and ends in a depressed shoulder, in which the glass scale D fits and may be cemented. The marks $fff$ on this scale may be pressed in or painted or etched on or placed thereon in any suitable method. If the measure should be made of uncolored or transparent glass, the marks or scale would be pressed or etched directly on the side of the vessel.

The cover is constructed as follows: A flat plate, $c$, is provided with a flange, $l$, which extends downward at right angles to the plane of the plate $c$, and which is intended to over and be cemented or otherwise fastened to the top edge of the measure, which, where covered by this plate, is shorter or lower by just the thickness of the plate than the balance of it. This plate $c$ should preferably extend toward and slightly beyond the center of the vessel, where there is pivoted upon it, at $h$, another and similar plate, $i$, so arranged as to swing around and cover the space left uncovered by the plate $c$. The particular proportions or shapes of the two plates $c$ and $i$ are not material. The plate $c$ being stationary and sunk in the top edge of the vessel A just its own thickness, as will be readily seen, the plate $i$, pivoted on it, will exactly and closely swing and touch the top edge not covered by the plate $c$. A knob, $g$, is placed on the plate $i$ to manipulate it with.

One great advantage of a measure made of pottery or glass ware with my improvements over the metal measure generally in use is its cleanliness, in that there can be no corrosive or chemical action set up, as is the case where fermented liquors remain any length of time in metal.

Having described my invention, what I claim to be new, and desire to secure by Letters Patent, is—

1. A glass or pottery ware measure for liquids, having a measuring device consisting of a recess in the side thereof, with apertures at top or bottom into the vessel, covered with a glass scale, substantially as described.

2. A glass or pottery ware measure for liquids, having a recess in the side of the vessel, made by depressing its walls, arranged to receive a glass measuring-scale to be cemented or otherwise secured over it, substantially as described.

3. In a glass or pottery ware vessel, a top or cover consisting of a plate, $c$, with a flange, $l$, resting on the top edge of the vessel, which is sunk the thickness of such plate below the balance of the top edge, and a plate, $i$, which is pivoted onto the plate $c$ at or near the center of the vessel, and constructed so as to slide on the plate $c$ and closely cover the space left uncovered by the latter, substantially as described.

MAX WOLF.

Witnesses:
ERNEST LASCHÉ,
JAMES DEMAREST.